(12) United States Patent
Mauler et al.

(10) Patent No.: US 6,703,109 B2
(45) Date of Patent: Mar. 9, 2004

(54) PLANAR PRODUCT INCLUDING A PLURALITY OF ADHESIVELY BONDED FIBROUS PLIES

(75) Inventors: Dirk Mauler, Ilvesheim (DE); Bernhard Reichling, Speyer (DE)

(73) Assignee: SCA Hygiene Products GmbH, Mannheim (DE)

( * ) Notice: Subject to any disclaimer, the term of this patent is extended or adjusted under 35 U.S.C. 154(b) by 0 days.

(21) Appl. No.: 09/850,063

(22) Filed: May 8, 2001

(65) Prior Publication Data

US 2002/0015823 A1 Feb. 7, 2002

(30) Foreign Application Priority Data

May 9, 2000 (DE) .......................... 100 22 464

(51) Int. Cl.[7] .................. B32B 3/00; B32B 31/00; B31F 1/12; D21H 11/00
(52) U.S. Cl. .................. 428/154; 428/166; 162/111; 156/290; 156/331.6
(58) Field of Search .................. 428/152, 153, 428/154, 166, 156, 172; 162/109, 112, 113, 111; 156/196, 209, 290, 292, 291, 331.6

(56) References Cited

U.S. PATENT DOCUMENTS

| 3,673,060 A | | 6/1972 | Murphy et al. | |
|---|---|---|---|---|
| 3,700,623 A | * | 10/1972 | Keim | ............... 260/80.3 R |
| 3,772,076 A | * | 11/1973 | Keim | ............... 162/168 |
| 5,173,351 A | | 12/1992 | Ruppel et al. | |
| 5,173,521 A | * | 12/1992 | Ishino | ............... 524/45 |
| 5,374,334 A | | 12/1994 | Sommese et al. | |
| 5,849,405 A | * | 12/1998 | Wang et al. | ............... 428/304.4 |

FOREIGN PATENT DOCUMENTS

| DE | 198 29 757 | 5/2000 |
|---|---|---|
| EP | 0 247 539 | 12/1987 |
| EP | 0 644 247 A2 | 3/1995 |
| EP | 0 743 172 A1 | 11/1996 |
| WO | 97/11226 | 3/1997 |
| WO | 99/36465 | 7/1999 |

OTHER PUBLICATIONS

"Das Papier", vol. 46, issue 10A/92, pp. V 38–V 45 *Polyvinylamin—Eine neue Klasse von Polymeren für . . .*; F. Linhart, W. Auhorn.

"Wochenblatt für Papierfabrikation", issue Aug. 1999, *Massgeschneiderte Leistungsprofile durch die flexible Struktur . . .*; A.W. Strangle, W.J. Auhorn.

* cited by examiner

*Primary Examiner*—Donald J. Loney
(74) *Attorney, Agent, or Firm*—Young & Thompson

(57) ABSTRACT

The present invention relates to a planar product in which a plurality of fibrous plies are bonded to each other with the aid of an adhesive containing a polymer with units derived from a vinylamine. This adhesive improves wet and/or dry ply bonding. The present invention relates more particularly to tissue products and non-woven products in which this adhesive promotes ply bonding.

18 Claims, No Drawings

PLANAR PRODUCT INCLUDING A PLURALITY OF ADHESIVELY BONDED FIBROUS PLIES

FIELD OF THE INVENTION

The invention relates to a planar product in which a plurality of fibrous plies are bonded to each other by a special adhesive, and to the use of the adhesive for producing ply bonding of the fibrous plies. The present invention relates more particularly to tissue products and non-woven products in which bonding the plurality of plies is produced by said adhesive.

PRIOR ART

Tissue-making counts as a method of paper making, due to its basic agreement in the methods of production (wetlaying). However, tissue-making, better, raw tissue production—where involving the single-ply (intermediate) product produced on a special paper-making machine for the production of tissue or tissue paper—differs from paper-making by its extremely low basis weight, usually of less than 65, more preferably less than 45 g/m$^2$ and its very much higher tensile energy absorption index. The tensile energy absorption index materializes from the tensile energy absorption by relating the tensile energy absorption index to the test specimen volume prior to testing (length, width, thickness of the specimen between clamps prior to tensile loading).

In addition paper and tissue paper differs generally as regards the module of elasticity characterizing the stress/strain response of these planar products as the material characteristic as a function of the production conditions, the raw materials and chemical additives employed.

The high tensile energy absorption index of a tissue paper results from the outer and/or inner crepe. The former is produced by compression of the web of tissue paper adhering to the drying cylinder by the effect of a crepe knife, the latter by the difference in speed between two fabrics in sequence or, for example, between a sheeting fabric and one or two fabrics.

It is from this high tensile energy absorption index (see DIN EN 12625-4 and DIN EN 12625-5) that the majority of the useful properties as usual for tissue and tissue products result. One example are tissue products for hygiene applications (hygiene products, more particularly hygiene paper products) which find application in a wealth of cleaning functions, e.g. in personal grooming and hygiene, in home, industry and institutional areas. They are used to absorb fluids, for decorative purposes, for packaging or even just as supporting material, as is common for example in medical practices or in hospitals. Hygiene paper products with their broad range of applications count today as products for everyday use.

Hygiene papers include mainly all types of dry-creped tissue products, but also including wet-creped papers.

"Tissue papers" or better, raw tissue papers are generally described as the single-ply intermediate products coming from the paper-making machine of lightweight papers, i.e. papers having a low basis weight which as a rule are dry-creped on a yankee cylinder with the aid of a crepe knife, whereby the single-ply raw tissue may be built up of one or more layers.

"Tissue products" are single or multi-ply finished products produced from raw tissue tailored to final consumer requirements, i.e. tailored in accordance with a requirements profile differing in many respects.

Typical properties of tissue products are their good ability to absorb tensile stress, their draping facility, good textile-like flexibility—properties often termed bulk softness—high surface softness, high specific bulk coupled with a perceptible thickness, an as high as possible liquid absorbency and depending on the application a suitably good wet and dry strength whilst featuring an interesting visual finish of the outer product surface. It is due to these properties that tissue papers are worked into tissue products (tissue paper products) available to final consumers in a wealth of different types and tailored applications, for example as wipes, towels, household and especially kitchen towels, as sanitary products (e.g. toilet papers), paper handkerchiefs, cosmetic tissues (facials) or serviettes/napkins.

Where multi-ply tissue products are concerned, care must be taken that the individual plies are bonded to each other by adequate ply bonding, although the ply bonding should not have a negative effect on the softness and absorptivity. Producing ply bonding by mechanical embossing pressure is disclosed for example by GB-C-363699. However, the ply bonding produced thereby is not particularly strong. Apart from this the necessary high embossing pressure may result in embossing knobs in the finished product which are conspicuous and rough to touch.

This is why ply bonding by chemical methods, i.e. gluing has materialized. Making use of an adhesive in this respect also in combination with mechanical techniques (embossing methods) have found application in producing ply bonding. U.S. Pat. No. 3,673,060 and U.S. Pat. No. 5,173,351 teach, for example, applying an adhesive in the region of the embossing roll directly to the side of the paper web to be later located on the inside of the multi-ply product.

The adhesives employed for a chemically produced ply bonding typical contain components soluble or dispersible in water such as polyvinyl alcohol (see also U.S. Pat. No. 3,673,060), polyvinyl acetate, carboxymethyl cellulose, starch etc.

Conventional adhesives have the disadvantage, however, that they lose their adhesiveness when wet and the individual plies become detached from each other when the tissue paper is used wet. The technical problem involved in this respect is the subject matter of WO 97/11226. This publication teaches the addition of a water-soluble cationic polymer (glyoxalated polyacrylamide, polyethyleneimine and preferably polyamide epichlorohydrine resin) to an adhesive on the basis of conventional adhesive components (starch, polyvinyl alcohol) to enhance the bonding capacity of the adhesive when wet.

The technique described therein for improving the ply bonding in multi-ply paper, more particularly in tissue products, does not always result in satisfactory ply bonding when dry and/or wet.

Problems associated with ply bonding when dry and/or wet may also be encountered in other planar products having a plurality of fibrous plies (more particularly cellulose fibrous plies) such as non-woven or textile plies.

SUMMARY OF THE INVENTION

The object of the present invention is thus to provide novel planar products, more particularly tissue products and non-woven products including a plurality of fibrous plies which excel by their ply bonding when dry and/or wet.

DESCRIPTION OF THE INVENTION

The aforementioned object is achieved by a planar product including a plurality of fibrous plies, characterized in that the plies are bonded to each other by means of an adhesive containing a polymer having units derived from a vinylamine.

The adhesive as employed in accordance with the invention is thus characterized by it containing a polymer having units derived from a vinylamine.

Such polymers, such as e.g. polyvinylamine itself, are known and are employed, for example, in paper production as retention and dewatering agents having a relatively low flocculation tendency, as fixing agents for unwanted substances, resins and dyes and as wet strengtheners. Known from EP-A-0,743,172 is to employ polyvinylamine and poly(vinyl alcohol-vinylamine) as a crepe expedient which is sprayed in combination with quadrivalent compunds of zirconium or dialdehydes onto the yankee cylinder to enhance the adhesion of the web of raw tissue to the yankee cylinder.

To simplify matters the polymer having units derived from a vinylamine as employed in accordance with the invention is termed "vinylamine polymer" in the following.

The vinylamine polymer has preferably a weight-averaged mol wt of at least 10,000 g/mol, more preferably in the range 50,000 to 10,000,000 g/mol and most preferred in the range 100,000 to 1,500,000 g/mol.

The vinylamine polymer may be a homo- or copolymer and as a rule has a linear configuration. Depending on the nature of the fibers and any further components as may be provided, even small percentages of the vinylamine units can produce the effect in accordance with the invention. Preferably the vinylamine polymer contains at least 1 mol %, more preferably at least 5 mol % and most preferred at least 10 mol % of the units derived from a vinylamine. The balance may consist of units derived from, for example, an α-olefin or some other vinyl monomer, e.g. vinyl formamide, vinyl acetate and/or vinyl alcohol. The percentage of further monomers is to be preferably selected, however, so that the resulting copolymer remains soluble or dispersible in water.

Preferably the vinylamine polymer is a homopolymer obtained by polymerization of a vinylamine with subsequent hydrolysis of the amide groups (BASF method). Partially hydrolyzed products suitably in accordance with the invention comprise preferably hydrolysis in the range 5 to 95%. Such partially hydrolyzed products include, in addition to free primary amine groups (protonated as a rule and thus influencing the charge density of the polymer), non-hydrolyzed units stemming from the vinyl formamide. This method of synthesis gives the person skilled in the art the possibility of optimizing the properties of the vinylamine polymer to be employed via the degree of polymerization and hydrolysis. Examples of suitably partially hydrolyzed polyvinylamines include Basocoll PR8092 available from BASF AG, Germany (75% hydrolysis) and Basocoll PR8094 (10% hydrolysis). Also suitable in accordance with the invention are the vinylamine polymers of the U.S. patents as cited in EP-A-0743172 (e.g. on page 4 thereof, lines 11–25) and in EP-A-0743172.

It is to be noted that the term adhesive as used in the present stands preferably for an adhesive in the sense of DIN 16920 which contains with the vinylamine polymer a synthetic basic substance and preferably water as the solvent. The adhesive may further also contain animal, vegetable and/or (other) synthetic basic substances. It may also contain minor amounts of a further solvent miscible in water as long as this is not to the detriment of the effect in accordance with the invention.

Preferably the adhesive in accordance with the invention contains, in addition to the vinylamine polymer, at least one conventional adhesive component soluble or dispersible in water.

The percentage of the adhesive component(s) is preferably in the range 0.1 to 20% by weight (as solids relative to the total weight of the adhesive), more preferably 1 to 10% by weight. The percentage of the vinylamine polymer is thus preferably in the range 0.1 to 20% by weight (as solids relative to the total weight of the adhesive), more preferably in the range 1 to 10% by weight, and most preferred in the range 2 to 7% by weight. The balance is preferably water. The adhesive in accordance with the invention may also contain, in addition, components acting as a thickener, although some adhesive components, such as e.g. starch or cellulose ether comprise both adhesive and thickening properties.

Suitable adhesive component(s) are conventional adhesive components soluble and dispersible in water such as glutine, casein, starch (also in modified form), dextrine, cellulose ether (e.g. methyl cellulose (MC), carboxymethyl cellulose (CMC), polyacrylate, polyvinyl alcohol, polyvinyl acetate (employed also in the dispersed form in paper chemistry, also as the copolymerisate formulated with vinyl alcohol where necessary), polyvinyl pyrrolidone, or mixtures thereof.

In one particularly preferred embodiment the adhesive in accordance with the invention contains a. the vinylamine polymer and
b. at least one adhesive component soluble or dispersible in water, selected from polyvinyl alcohol, polyvinyl acetate, a cellulose ether (such as MC and/or CMC) and starch; preferably polyvinyl alcohol or polyvinyl acetate, more particularly polyvinyl alcohol.

Preferably in this embodiment the percentage (as solid content) of the vinylamine polymer (a) is in the range 0.1 to 20, more preferably 1 to 10, most preferred 2 to 7% by weight and the percentage of (b), as solid content, is in the range 0.1 to 20, more preferably 1 to 10% by weight, each relative to the total weight of the adhesive. The balance is preferably water.

One variant of this embodiment which is high suitably consists of an adhesive containing the vinylamine polymer (a) in the range 1 to 10% by weight, polyvinyl alcohol in the range 1 to 10% by weight and the balance water.

The present invention relates also to the use of the adhesive as described above for bonding a plurality of fibrous plies and to a planar product obtained in this way. The fibers of the fibrous plies are preferably cellulose-based fibers as existing, for example, in pulp.

Preferably the planar product consists of substantially cellulose-based fibers, e.g. pulp fibers for finishing by techniques as employed conventionally in the paper industry. Depending on the field of application the planar product may also be admixed with other fibers, for example plastics fibers, preferably in a percentage of up to 50%, more preferably up to 30%. Suitably as the fibrous raw material for producing the planar product e.g. the multi-ply paper production, more particularly tissue paper or non-woven product are native pulps as produced e.g. by the sulphate or sulphite method, chemothermoechaniclly produced pulps (e.g. CTMP or HTCMP), fibrous raw materials made by a secondary fiber conditioning or mixtures thereof. Finishing techniques to be cited which may also influence ply bonding are more particularly reducing the remaining lignin content (kappa value) by bleaching and beating techniques to enhance the fiber surface area.

The planar product in accordance with the invention is preferably a paper product, more particularly a tissue paper product, a non-woven or a textile product. The term non-woven (see ISO 9092-EN29092) is used in this context to cover a broad range of products having properties between those of paper products and textile products. For producing the non-woven a wealth of different production methods may be used, such as e.g. airlaying, spun-laying as well as wetlaying methods, the former being by far popular in the typical drylaying methods whilst the wetlaying methods, similar to the situation in paper production, form more of a marginal group. Typical for non-wovens are flexible porous planar structures produced not by the classical methods of warp and weft weaving or by looping, but by twining and/or cohesive and/or adhesive binding of typical synthetic textile fibers or of mixtures of synthetic and natural fibers, e.g. cellulose fibers.

Preferably the planar product involved is a tissue product.

As indicated at the outset the term tissue product in this context is meant to cover multiply crepe papers produced from an aqueous dispersion having a basis weight in the range of typical 10 to 65 $g/m^2$, more particularly in the range 10 to 45 $g/m^2$.

The planar product in accordance with the invention, more particularly the tissue paper, comprises at least two plies, typical two to six plies, more particularly two to four plies. The individual plies may be layered. The term layer relates to a change in the chemical and/or physical properties within a ply, caused e.g. by a different fiber composition. Unlike plies, layers as a rule cannot be separated from each other.

The tissue paper product as the preferred embodiment of the planar product is preferably a wipe, e.g. wipe paper, windscreen wipe, a wipe for industrial applications, a towel or a wipe for household use;

a sanitary product, e.g. toilet paper (also wet), a paper handkerchief (also wet);

a household towel, e.g. kitchen towels;

a towel;

a tissue for facial use, e.g. a makeup removal tissue (facial) or cosmetic tissue;

a serviette/napkin;

bed linen;

a garment, e.g. as used disposable in hospitals or catering.

To bond a plurality of the plies to each other of the planar product in accordance with the invention, more particularly of the tissue paper product, the adhesive is applied to at least part of the contact surface area of the plies. Where web-shaped products are concerned (e.g. toilet paper) two strip-shaped glued zones may be provided running parallel to each other and in the vicinity of the two edges of the web. Where rectangular products are concerned, such as e.g. handkerchiefs, ply bonding may be formed framing the edge zone. Furthermore, substantially the complete surface area may be coated with the adhesive, preferably in combination with an embossed pattern extending over the same surface area.

For applying the adhesive the following systems may be used for example:

roll application by means of a dip roll and transfer roll roll application by means of a screen roll, which has a knife, and a transfer roll or an application roll spray application directly to the product or indirectly to a roll for fully or partly irregular or regular distribution contact application by means of a fixed gluing nip to a moving roll or product web extrusion arrangements e.g. hot gluing arrangements.

After adhesive application and ply bonding the resulting product is preferably allowed to age, ply bonding as a rule being enhanced thereby probably due to more particularly evaporation of the solvent or dispersion agent. The duration of the aging process (several days as a rule) can be easily determined by the person skilled in the art by measuring the delamination resistance. Aging can also be accelerated by increasing the temperature.

In accordance with the invention it is possible to produce ply bonding solely by chemical means by gluing at least part of the contact surface area. Preferably, however, the plies to be bonded are exposed also to mechanical force, more particularly as exerted by embossing techniques. It is particularly preferred to apply the adhesive to the contact points produced by mechanical shaping, more particularly embossing. Suitable embossing methods include foot-to-foot, top-to-ground (nested), border and perforation embossing as well as the various known embossing methods permitting joining the material webs together by contact of protruding and/or recessed areas at the protruding points, the recessed points or their flanks. To bond a plurality of plies to each other it is possible for example to apply the adhesive in the region of the embossing roll directly to one side of the web which in the later multi-ply product is located on the inside as is described, for example, in U.S. Pat. No. 3,673,060 and U.S. Pat. No. 5,173,351. However, it is also possible to allocate the adhesive to the embossing station so that the adhesive is applied directly to the embossing roll where the adhesive is then applied to the side of the material web which in the finished product is located on the outside so that the adhesive migrates through the material web to produce ply bonding on the inside.

The amount of adhesive applied (including the solvent or dispersion agent, more particularly water) is preferably in the range 0.01 to 100 $g/m^2$, more particularly 0.01 to 50 $g/m^2$ (treated surface area), whereby values in the range 0.1 to 20 $g/m^2$ may be more preferably preferred. The amount applied depends, among other things, also on the total solids content of the adhesive which is preferably in the range 2 to 20% by weight.

The present invention will now be detailed by way of an example.

In three test series the influence of a standard adhesive (comparison example 1), an adhesive in accordance with WO 97/11226 (comparison example 2) and an adhesive employed in accordance with the invention on the ply bonding and strength properties of a two-ply kitchen towel was tested. The kitchen towel had a total basis weight of 44 $g/m^2$ (2×22 $g/m^2$). The raw tissue used for producing the kitchen towel consisted totally of pulp fibers (pulp type: 70% by weight sulphated pine pulp (Grapho Celeste made by SCA Östrand Papierfabrik), 30% by weight sulphited spruce pulp).

The standard formulation (comparison example 1) consisted of a 20% by weight solution of polyvinyl alcohol (Adhesin 1500 available from Henkel, Germany).

The formulation in accordance with WO 97/11226 (comparison example 2) consisted of 4% by weight polyvinyl alcohol (Adhesin 1500, see above), 5% by weight polyamidoamine epichlorohydrine resin (NFM Kymene 617 available from Hercules, USA) and 91% by weight water.

The adhesive employed in accordance with the invention (example) consisted of 4% polyvinyl alcohol (Adhesin 1500, see above), 5% of a partially hydrolyzed polyvinylamine (Basocoll 8092 available from BASF Germany; 75% hydrolysis) and 91% by weight water.

The two plies of the kitchen towel were embossed and unified by the nesting method. For this purpose two tissue plies were provided with the same regular pattern of embossing knobs over the full surface area by means of an embossing roll. The embossing knobs were then coated on one ply on the side facing away from the embossing roll (i.e. the knob tops) with 1 to 5 g/m² of one of the three adhesive formulations, followed by joining the plies in such a manner that in each case one knob tip of one ply met one valley (ground of knobs) between the knob tops of the other ply.

The three kitchen towels thus obtained were then tested as to their strength properties and ply bonding by the following methods:

a. The basis weight (area-related weight, BW) was determined in accordance with DIN 54540 Part 2 of June 1989.

b. Wet and dry breaking strength in the machine direction (MD) and crosswise direction (CD) as regards the web of raw tissue was established in accordance with DIN 54540 Part 7 and Part 8 resp. each of June 1989.

c. The delamination resistance as a measure for ply bonding was established in accordance with the following methods: after embossing and bonding the two plies with the aid of the three adhesives as described above the products were left to age for at least a week under the following conditions: 50% humidity at 23° C. Test strips 50 mm wide and 100 mm long were cut from the aged product. The longitudinal direction of the strips corresponded to the machine direction (MD) of the web of raw tissue.

Prior to testing the specimens were allowed to age a further 10 minutes at 120° C. to allow the resin components to fully cure.

After cooling the test strips were dipped in distilled water for 15 secs and then excess water carefully removed by the test strip being placed on a kitchen towel, after which a second kitchen towel was placed on the strip and first kitchen towel. The kitchen towels with the test strip in between were then lightly squeezed manually (The kitchen towel was Zewa® Wisch und Weg made by SCA Hygiene Products GmbH, Mannheim, Germany). The test strip was then spliced open manually at one end sufficiently (approx. 30 mm) into two single plies so that it could be mounted in the clamps of a tensile tester (tensile tester ZW2.5 TN1S made by Zwick, Germany with a load cell of up to 10 N capacity). Tensile testing was implemented roughly 15 secs after watering.

The tensile tester was operated under the following conditions:

tensile rate: . . . 100 mm/min starting distance between clamps: . . . 50 mm test distance: . . . 50 mm The average of the maximum tensile load, expressed as $F_{max}$ was taken as the measure for ply bonding.

The results obtained are listed in the following Table.

| Property | Comp.ex 1 | Comp.ex 2 | Example |
|---|---|---|---|
| basis weight (BW) (g/m²) | 41.8 | 43.5 | 44.2 |
| dry breaking strength (MD) (N/50 mm) | 12.7 | 12.4 | 16.7 |
| dry breaking strength (CD) (N/50 mm) | 8.9 | 9.6 | 11.1 |
| index*, dry (N/50 mm)/(g/m²) | 0.258 | 0.253 (−1.94%) | 0.314 (+21.70%) |
| wet breaking strength (MD) (N/50 mm) | 5.2 | 5.4 | 8.2 |
| wet breaking strength (CD) (N/50 mm) | 3.0 | 4.5 | 4.6 |
| index*, wet (N/50 mm)/(g/m²) | 0.0981 | 0.1138 (+16.00%) | 0.1448 (+47.60%) |
| rel. wet strength MD (%) | 41 | 44 | 49 |
| rel. wet strength CD (%) | 34 | 47 | 41 |
| max del. resistance F max (N) | 0.011 | 0.022 | 0.038 |

*((MD + CD)/2)/BW

It is obvious from the results that ply bonding with the adhesive employed in accordance with the invention is three times better than that of comparison example 1 and better than 70% of that of comparison example 2. Furthermore, an improved dry and wet strength was observed.

What is claimed is:

1. A tissue paper product comprising a plurality of tissue paper plies, each of the tissue paper plies being a wet-laid fibrous web with an inner and/or outer crepe, and an adhesive that bonds the plies to each other, the adhesive containing a polymer having units derived from a vinylamine.

2. The tissue paper product according to claim 1, wherein said adhesive contains (a) said polymer having units derived from a vinylamine, and (b) at least one component selected from the group consisting of polyvinyl alcohol, polyvinyl acetate, a cellulose ether and starch.

3. The tissue paper product according to claim 2, wherein said adhesive contains said vinylamine polymer (a) in the range of 0.1 to 20% by weight, and said component (b) in the range of 0.1 to 20% by weight; each relative to the total weight of the adhesive.

4. The tissue paper product according to claim 3, wherein said adhesive contains said vinylamine polymer (a) in the range of 1 to 10% by weight, polyvinyl alcohol in the range of 1 to 10% by weight, and the balance water; each relative to the total weight of the adhesive.

5. The tissue paper product according to claim 3, wherein the percentage of polyvinylamine polymer (a) ranges from 2 to 7% by weight.

6. The tissue paper product according to claim 1, wherein said polymer is a polyvinylamine obtained by polymerization of a vinylamide with subsequent hydrolysis of amide groups in the range of 5 to 95%.

7. The tissue paper product according to claim 1, wherein the tissue product has a basis weight ranging from 10 to 65 g/m².

8. The tissue paper product according to claim 7, wherein the tissue product has a basis weight ranging from 10 to 45 g/m².

9. The tissue paper product according to claim 1, wherein said tissue product is selected from the group consisting of a wipe, a sanitary product, a paper handkerchief, a household towel, a towel, a facial tissue, a napkin, a serviette, a bed linen and a garment.

10. The tissue paper product according to claim 1, wherein at least one ply of said tissue product is embossed.

11. The tissue paper product according to claim 1, wherein the vinylamine polymer has a weight-averaged molecular weight of at least 10,000 g/mol.

12. The tissue paper product according to claim 11, wherein the weight-averaged molecular weight ranges between 50,000 to 10,000,000 g/mol.

13. The tissue paper product according to claim 12, wherein the weight-averaged molecular weight ranges between 100,000 to 1,500,000 g/mol.

14. A method of bonding a plurality of tissue paper plies, which comprises the steps of making each of the tissue paper plies by providing a wet-laid fibrous web with an inner and/or outer crepe, and applying an effective amount of an adhesive containing a polymer with units derived from a vinylamine to at least part of a contact surface of the plies to bond the plies to each other.

15. The method according to claim 14, wherein the effective amount of adhesive applied ranges from 0.01 to 50 g/m$^2$.

16. The method according to claim 15, wherein the effective amount of adhesive applied ranges from 0.1 to 20 g/m$^2$.

17. The method according to claim 14, wherein the tissue product has a basis weight ranging from 10 to 65 g/m$^2$.

18. A tissue paper product, comprising:
- a multiply structure with plural tissue paper plies that each include a fibrous web and an inner and/or outer crepe, each of the plies having a weight basis ranging from 10 to 65 g/m$^2$; and
- an adhesive between each adjacent pair of said plies that adheres the adjacent plies to each other, said adhesive comprising 1% to 10% by weight vinylamine polymer, 1% to 10% by weight polyvinyl alcohol, and water.

* * * * *